United States Patent
Sodagar

(10) Patent No.: US 12,167,110 B2
(45) Date of Patent: Dec. 10, 2024

(54) AUXILIARY MPDS FOR MPEG DASH TO SUPPORT PREROLLS, MIDROLLS AND ENDROLLS WITH STACKING PROPERTIES

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 18/065,154

(22) Filed: Dec. 13, 2022

(65) Prior Publication Data
US 2023/0224557 A1  Jul. 13, 2023

Related U.S. Application Data

(60) Provisional application No. 63/298,919, filed on Jan. 12, 2022.

(51) Int. Cl.
*H04N 21/858* (2011.01)
*H04L 67/02* (2022.01)

(52) U.S. Cl.
CPC ......... *H04N 21/8586* (2013.01); *H04L 67/02* (2013.01)

(58) Field of Classification Search
CPC ......... H04N 21/8586; H04N 21/26258; H04N 21/8456; H04N 21/435; H04N 21/4348; H04L 67/02; H04L 65/612; H04L 65/65
See application file for complete search history.

(56) References Cited

U.S. PATENT DOCUMENTS

| | | | | |
|---|---|---|---|---|
| 2009/0076898 | A1* | 3/2009 | Wang | G06Q 30/02 705/14.56 |
| 2014/0013003 | A1* | 1/2014 | Giladi | H04L 65/612 709/231 |

(Continued)

OTHER PUBLICATIONS

Thomas Stockhammer, "Editor's Version of DASH IS 4th Edition", International Organisation for Standardisation Organisation Internationale De Normalisation ISO/IEC JTC1/SC29/WG11 Coding of Moving Pictures and Audio, ISO/IEC JTC1/SC29/WG11 MPEG2019/m52458, Jan. 2020, Brussels, BE, pp. 1-287.

(Continued)

*Primary Examiner* — Adil Ocak
(74) *Attorney, Agent, or Firm* — Sughrue Mion, PLLC

(57) ABSTRACT

A method and apparatus may be provided for signaling auxiliary media content over a (DASH) media stream. The method may include receiving one or more auxiliary descriptors, wherein a respective auxiliary descriptor among the one or more auxiliary descriptors includes a Uniform Resource Locator (URL) referencing one or more auxiliary media presentation descriptions (MPDs) and a stack mode value indicating a stack operation supported by a main DASH media stream. The method may also include retrieving one or more auxiliary media segments based on the URL referenced in the respective auxiliary descriptors among the one or more auxiliary descriptors, and playing the one or more auxiliary media segments and the one or more main DASH media segments from a media source extension (MSE) source buffer at least once in at least one order based on the one or more auxiliary descriptors and the stack mode value.

17 Claims, 5 Drawing Sheets

(56) References Cited

U.S. PATENT DOCUMENTS

| | | |
|---|---|---|
| 2015/0032855 A1 | 1/2015 | Wang et al. |
| 2015/0269629 A1* | 9/2015 | Lo .......................... H04L 65/65 |
| | | 705/14.66 |
| 2019/0158815 A1* | 5/2019 | He ....................... H04N 21/816 |
| 2020/0029116 A1 | 1/2020 | Lohmar et al. |
| 2021/0243485 A1 | 8/2021 | Kobayashi et al. |

OTHER PUBLICATIONS

International Search Report dated Apr. 4, 2023 in International Application No. PCT/US22/52946.

Written Opinion dated Apr. 4, 2023 in International Application No. PCT/US22/52946.

* cited by examiner

AUXILIARY MPDS FOR MPEG DASH TO SUPPORT PREROLLS, MIDROLLS AND ENDROLLS WITH STACKING PROPERTIES

CROSS REFERENCE TO RELATED APPLICATION

The present application claims priority to U.S. Provisional Application No. 63/298,919, filed on Jan. 12, 2022, the contents of which is hereby expressly incorporated by reference, in its entirety, into the present application.

FIELD

Embodiments of the present disclosure are directed to the streaming media content, and more particularly to streaming media, ad, and live content in accordance with Moving Picture Experts Group (MPEG) dynamic adaptive streaming over hypertext transfer protocol (DASH).

BACKGROUND

MPEG DASH provides a standard for streaming media content over IP networks. In MPEG DASH, media presentation description (MPD) and events are used for delivering media timeline related events to a client. ISO/IEC 23009-1 DASH standard allows the streaming of multi-rate content. The DASH standard provides a single linear timeline where the periods are the continuation of each other in a single timeline. ISO/IEC 23009-1 also provides a tool for MPD chaining, i.e. signaling the URL of the next MPD to play in an MPD which can be used for pre-roll ad insertion.

MPEG DASH provides a standard for streaming multimedia content over IP networks. While the standard addresses linear playback of media content, the standard fails to address situations of nonlinear operation, e.g., where the media segments associated with different timelines that are independent of each other. MPD chaining and pre-roll ad insertion may be used to overcome the above-mentioned deficiencies.

However, even MPD chaining and pre-roll ad insertion fails when DASH players use W3C Media Source Extensions because it is very challenging to address such nonlinear playback with one single MSE source buffer.

Therefore, a method for combining auxiliary content or independent content that is different from the main media content is needed. Specifically, methods and apparatus of combining auxiliary content with main media content as pre-roll playback, mid-roll playback, or end-roll playback are needed. A method for stacking auxiliary content is needed. Furthermore, methods of carrying information associated with the auxiliary content and stacking information are needed.

SUMMARY

The present disclosure addresses one or more technical problems. The present disclosure includes a method, process, apparatus, and non-transitory computer-readable medium for implementing a new concept—auxiliary presentation and auxiliary MPDS for DASH standard that may allow describing auxiliary or independent media presentation from the main media presentation. Embodiments of the present disclosure are also directed to auxiliary presentations including auxiliary media content that may be presented as pre-roll media content, mid-roll content, or end-roll content within other auxiliary presentations. Embodiments also relate to stacking multiple auxiliary presentations.

Embodiments of the present disclosure may provide a method for signaling chained auxiliary media content including pre-roll media content, mid-roll media content, and end-roll media content in a main dynamic adaptive streaming over HTTP (DASH) media stream. The method may include receiving one or more auxiliary descriptors, wherein a respective auxiliary descriptor among the one or more auxiliary descriptors includes a Uniform Resource Locator (URL) referencing one or more auxiliary media presentation descriptions (MPDs) and a stack mode value indicating a stack operation supported by a main DASH media stream; retrieving one or more auxiliary media segments based on the URL referenced in the respective auxiliary descriptors among the one or more auxiliary descriptors, wherein the one or more auxiliary media segments is independent of one or more main DASH media segments; and playing the one or more auxiliary media segments and the one or more main DASH media segments from a media source extension (MSE) source buffer at least once in at least one order based on the one or more auxiliary descriptors and the stack mode value.

Embodiments of the present disclosure may provide an apparatus for signaling chained auxiliary media content including pre-roll media content, mid-roll media content, and end-roll media content in a main dynamic adaptive streaming over HTTP (DASH) media stream. The apparatus may include at least one memory configured to store computer program code; at least one processor configured to access the computer program code and operate as instructed by the computer program code. The program code may include receiving code configured to cause the at least one processor to receive one or more auxiliary descriptors, wherein a respective auxiliary descriptor among the one or more auxiliary descriptors includes a Uniform Resource Locator (URL) referencing one or more auxiliary media presentation descriptions (MPDs) and a stack mode value indicating a stack operation supported by a main DASH media stream; retrieving code configured to cause the at least one processor to retrieve one or more auxiliary media segments based on the URL referenced in the respective auxiliary descriptors among the one or more auxiliary descriptors, wherein the one or more auxiliary media segments is independent of one or more main DASH media segments; and playing code configured to cause the at least one processor to play the one or more auxiliary media segments and the one or more main DASH media segments from a media source extension (MSE) source buffer at least once in at least one order based on the one or more auxiliary descriptors and the stack mode value.

Embodiments of the present disclosure may provide a non-transitory computer-readable medium storing instructions. The instructions may include one or more instructions that, when executed by one or more processors of a device for signaling chained auxiliary media content including pre-roll media content, mid-roll media content, and end-roll media content in a main dynamic adaptive streaming over HTTP (DASH) media stream, cause the one or more processors to receiving one or more auxiliary descriptors, wherein a respective auxiliary descriptor among the one or more auxiliary descriptors includes a Uniform Resource Locator (URL) referencing one or more auxiliary media presentation descriptions (MPDs) and a stack mode value indicating a stack operation supported by a main DASH media stream; retrieving one or more auxiliary media segments based on the URL referenced in the respective auxiliary descriptors among the one or more auxiliary descriptors, wherein the one or more auxiliary media segments is independent of one or more main DASH media segments; and playing the one or more auxiliary media segments and the one or more main DASH media segments from a media source extension (MSE) source buffer at least once in at least one order based on the one or more auxiliary descriptors and the stack mode value.

BRIEF DESCRIPTION OF THE DRAWINGS

[1] Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
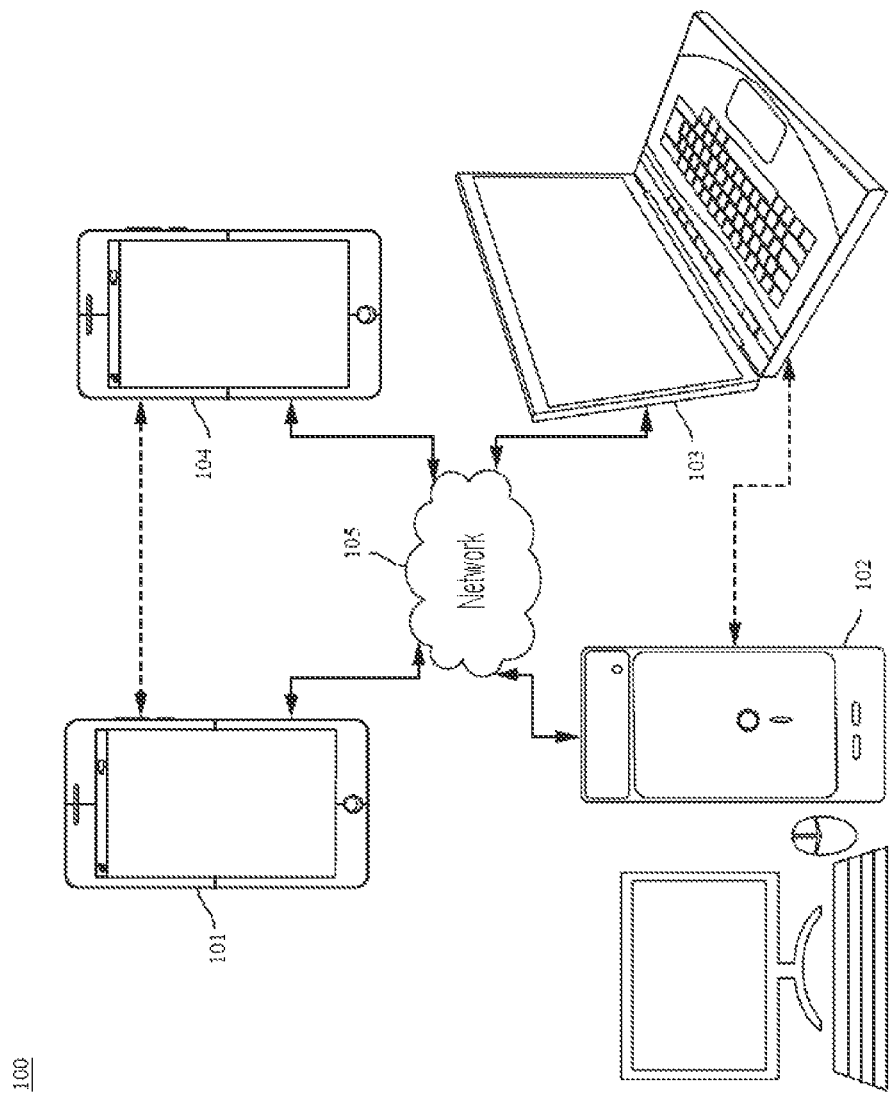
FIG. 1 is a simplified illustration of a communication system, in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
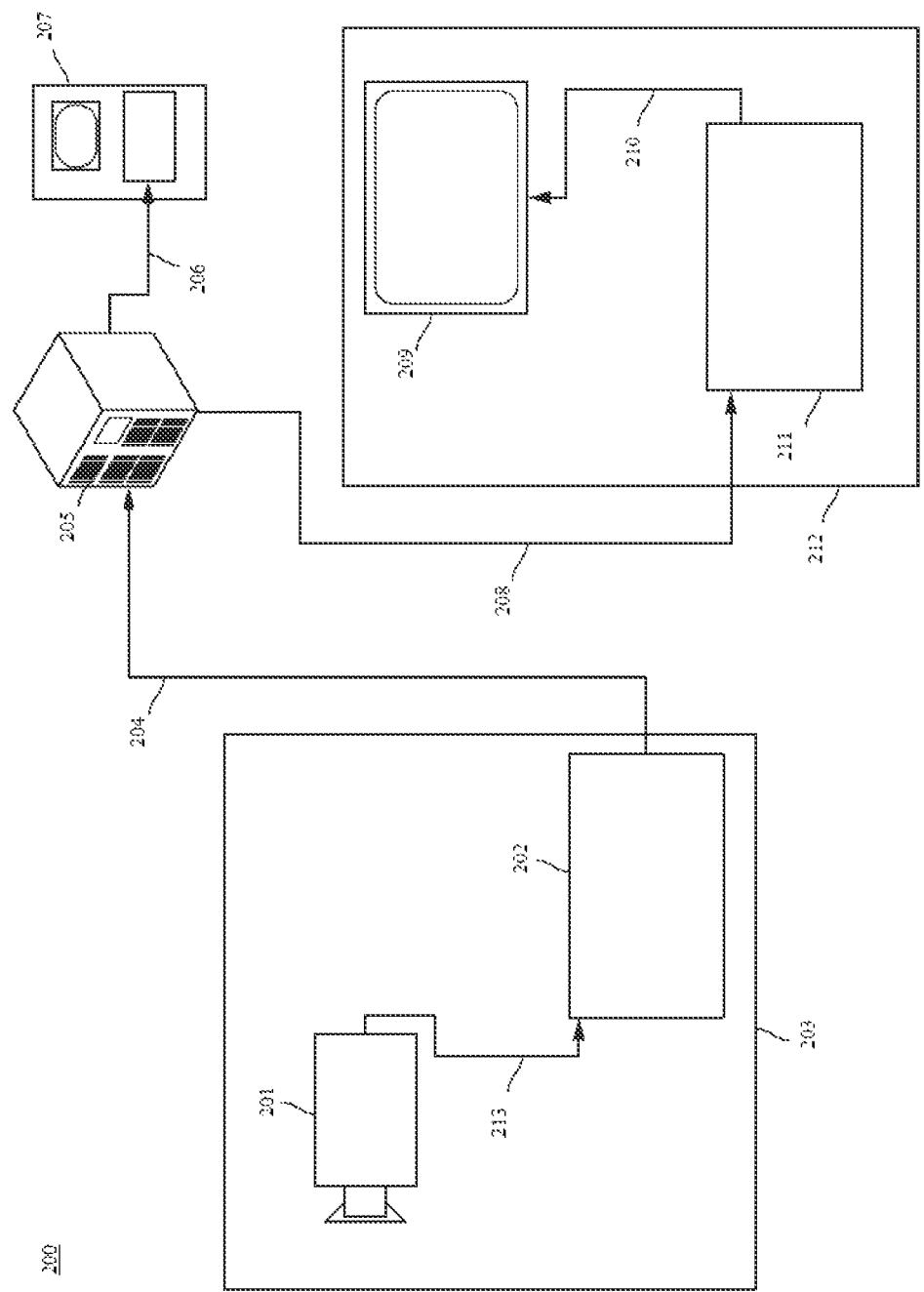
FIG. 2 is an example illustration of placements of components in a streaming environment, in accordance with embodiments.

FIG. 2 illustrates, as an example, the placement of a video encoder and decoder in a streaming environment. Embodiments may be applicable to other video enabled applications, including, for example, video conferencing, digital TV, storing of compressed video on digital media including CD, DVD, memory stick and the like, and so on.

A streaming system may include a capture subsystem 203 that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201. The encoder 202 can include hardware, software, or a combination thereof to enable or implement aspects of embodiments as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve encoded video bitstream 208 and 206 which may be copies of the encoded video bitstream 204. A client 212 can include a video decoder 211 which decodes the incoming copy of the encoded video bitstream 208 and creates an outgoing video sample stream 210 that can be rendered on a display 209 or other rendering device. In some streaming systems, the encoded video bitstreams 204, 206 and 208 can be encoded according to certain video coding/compression standards. Examples of those standards are noted above and described further herein.

Figure 3:
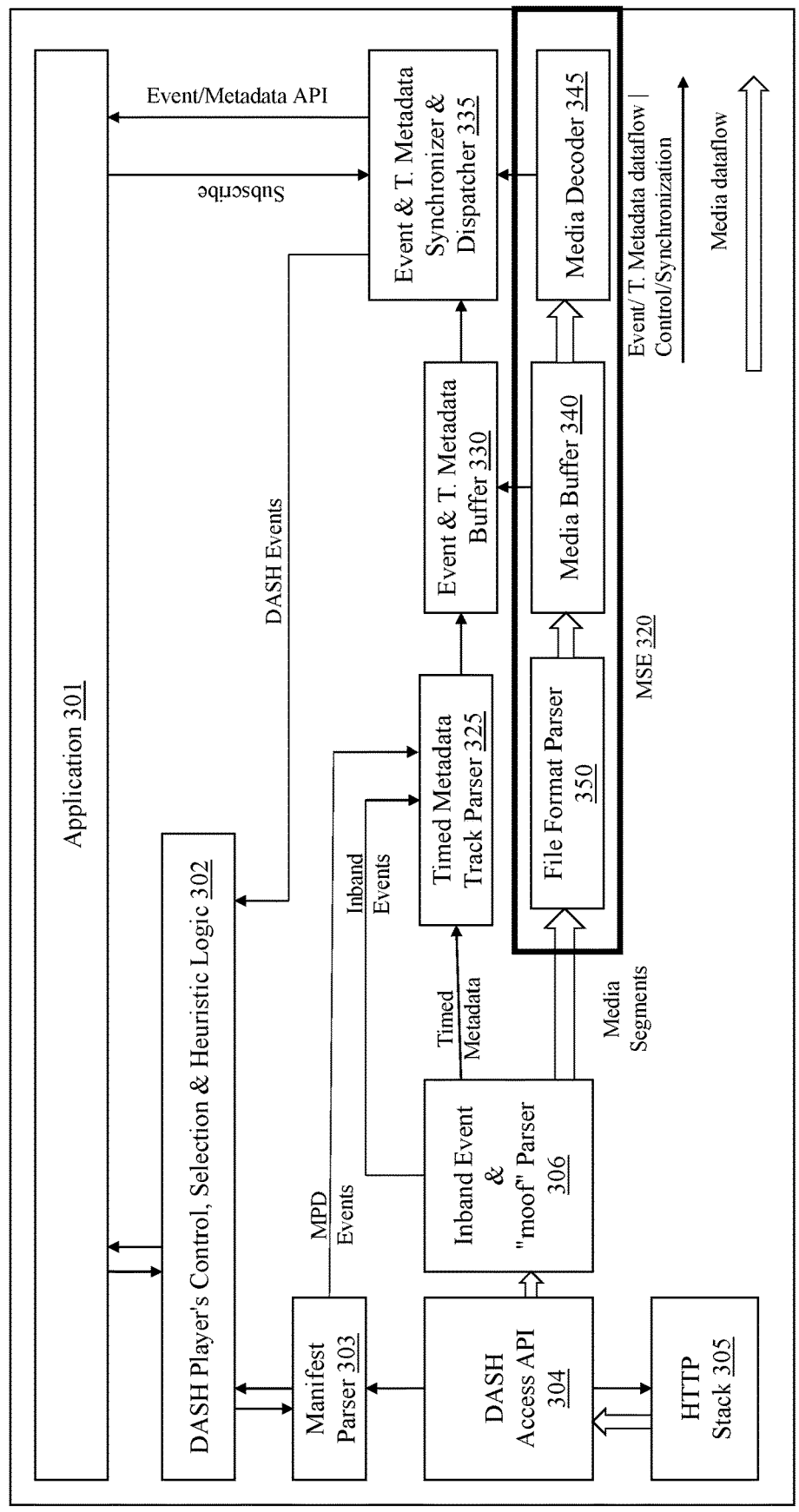
FIG. 3 is a simplified block diagram of a DASH processing model, in accordance with embodiments.

FIG. 3 shows a sample DASH processing model 300, such as of a sample client architecture for processing DASH and CMAF events. In the DASH processing model 300, a client's request of media segments (e.g., ad media segments and live media segments) may be based on described addresses in a manifest 303. The manifest 303 also describes metadata tracks from which a client may access segments of metadata tracks, parse them, and send them to an application 301.

The manifest 303 includes MPD events or events, and an inband event and 'moof' parser 306 may parse MPD event segments or event segments and append the event segments to an event and metadata buffer 330. The inband event and 'moof' parser 306 may also fetch and append the media segments to a media buffer 340. The event and metadata buffer 330 may send event and metadata information to an event and metadata synchronizer and dispatcher 335. The event and metadata synchronizer and dispatcher 335 may dispatch specific events to DASH players control, selection, and heuristic logic 302 and application related events and metadata tracks to application 301.

According to some embodiments, a MSE may include a pipeline including a file format parser 350, the media buffer 340, and a media decoder 345. MSE 320 is a logical buffer(s) of media segments, where the media segments may be tracked and ordered based on the media segments' presentation time. Media segments may include but may not be limited to ad media segments associated with ad MPDs and live media segments associated with live MPDs. Each media segment may be added or appended to the media buffer 340 based on the media segments' timestamp offset, and the timestamp offset may be used to order the media segments in the media buffer 340.

Since embodiments of the present application may be directed to building a linear media source extension (MSE) buffer from two or more nonlinear media sources using MPD chaining, and the nonlinear media sources may be ad MPDS and live MPDs, the file format parser 350 may be used to process the different media and/or codecs used by the live media segments included in the live MPDs. In some embodiments, the file format parser may issue a change type based on a codec, profile, and/or level of the live media segments.

As long as media segments exist in the media buffer 340, the event and metadata buffer 330 maintains corresponding event segments and metadata. The sample DASH processing model 300 may include a timed metadata track parser 325 to keep track of the metadata associated with the inband and MPD events. According to FIG. 3, the MSE 320 includes only the file format parser 350, the media buffer 340, and the media decoder 345. The event and metadata buffer 330 and event and metadata synchronizer and dispatcher 335 are not native to the MSE 320, inhibiting the MSE 320 from natively processing events and sending them to the application.

Auxiliary Presentation

Embodiments of the present disclosure define an auxiliary media presentation to be a media presentation that is independent of the main media presentation of an MPD. As an example, ad media segments or live media segments that are independent of the main media segments may be auxiliary presentations. Updates to any auxiliary media presentation or auxiliary media segments do not affect the main media segments. Similarly, updates to the main media segments do not affect the auxiliary media segments. Therefore, auxiliary media segments (also referred to as auxiliary media presentations or auxiliary presentations) may be completely independent of the main media segments (also known as main media presentations and media presentations in this disclosure).

Auxiliary MPD

An MPD is a media presentation description that may include a media presentation in a hierarchical organization. An MPD may include one or more sequence of periods, wherein each period may include one or more adaptation sets. Each adaptation set in an MPD may include one or more representations, each representation including one or more media segments. These one or more media segments carry the actual media data and associated metadata being encoded, decoded, and/or played. Auxiliary MPD may include one or more auxiliary media segments.

As stated above, embodiments of the present disclosure define an auxiliary MPD that represents auxiliary content that is independent from the main media content. According to an aspect, the main MPD may include a reference to at least one, or in some embodiments, each auxiliary MPD using an auxiliary descriptor. The auxiliary descriptor may have a specific syntax. As an example, an auxiliary descriptor may include a descriptor known as essential descriptor or may include descriptor known as supplemental descriptor that may describe or identify the auxiliary MPD.

According to an aspect of the present disclosure, the main MPD may include a URL link to the one or more auxiliary MPDs, which in turn have references to one or more auxiliary media content. A departure point during playback of the main MPD may be configured. A departure point may be a point in time at which an auxiliary media segment is played by departing from the main media segment. In some embodiments, the departure point may be before the start of the main media segment or a current auxiliary media segment. This may be referred to as a pre-roll playback. In some embodiments, the departure point may be at the end of the current auxiliary media segment or main media segment. This may be referred to as end-roll playback. In some embodiments, the departure point may be at any time during the playback of the main media segment or the current media segment. This may be referred to as mid-roll playback. In some embodiments, mid-roll playback may be indicated using an offset indicating the departure point from a current availably start time for the main media segment.

A rejoining point during playback may also be configured. In some embodiments, the rejoining point may be at an end of the playback of one or more auxiliary media segments. In some embodiments, the rejoining point may be at the live edge of the main media segments. In some embodiments, the rejoining point may be at the departure point at which the main media segment was halted. In some embodiments, the rejoining point may be after a specific duration of time from the departure point at which the main media segment was halted.

In embodiments where one or more auxiliary MPDs are stacked, i.e., one or more MPDs are to be played in an order, a plurality of stack modes may be supported by the main MPD. These stack modes may perform or process the MPDs in a specific order or method, and may be referred to as stacking operations. A first stack mode may be a "one-way" mode. In this stack mode, after the MPD of the last URL is played, the MPD of the first URL (the main MPD) in the stack is played. In some embodiments, the MPDs in a stack of MPDs including the main MPD and auxiliary MPD may be played in an order in which they are to be presented. As an example of a one-way mode, MPD1→MPD2→ . . . →MPDn→MPD1, where MPDn is the nth MPD starting from n=0 for main MPD and n>0 for auxiliary ones.

A second stack mode may be a "play-once" mode. In the play-once mode, the MPD of each URL in the stack is played only once, and when going back in the stack, if the URL is already played, the chaining and/or stacking is not considered again. As an example of a play-once mode, MPD1→MPD2→MPD3→MPD2→MPD1, where MPDn is the nth MPD starting from n=0 for main MPD and n>0 for auxiliary ones. A third stack mode may be a "play-everytime" mode. In the play-everytime mode, each auxiliary descriptor (also referred to as chaining descriptor) may be re-evaluated at each stack level, regardless of playback of the stack. As an example of a play-everytime mode, MPD1→MPD2→MPD3→MPD2→MPD3→MPD2→MPD3, where MPDn is the nth MPD starting from n=0 for main MPD and n>0 for auxiliary ones.

According to an aspect of the present disclosure, the auxiliary MPD support for the main MPD may be signaled and implemented with essential descriptor or supplemental descriptor. The descriptor may be signaled at the MPD level.

TABLE 1

Descriptor Semantics

| Attribute | Description |
|---|---|
| schemeIdURI | Set to urn:mpeg:dash:alternativempd:2022 |
| id | Use it for the general equivalency rule of descriptors. |
| value | Space-separated values in the following order:<br>• URL: the alternative MPD URL<br>• Start Time or Departure Time: An offset from AST for playing the alternative MPD with the following possible values:<br>　- 0: immediately at the MPD download<br>　- end: at the end of the current MPD timeline<br>　- PTXX: the offset from MPD AST<br>• Rejoin Time: the time for rejoining the main MPD with the following possible values:<br>　- 0: the departure time to the alternative MPD in the main MPD<br>　- end: End of alternative MPD presentation<br>　- live: to the live edge of the main MPD<br>　- PTXX: the offset from the departure time in the main MPD<br>• Stack Modes:<br>　- one-way mode<br>　- play-once mode<br>　- play-everytime mode |

According to an aspect of the present disclosure, auxiliary MPD support may be implemented using MPD events. In this embodiment, event stream semantics may be used.

TABLE 2

Event Stream Semantics

| Element or Attribute Name | Use | Description |
|---|---|---|
| EventStream | | specifies event Stream |
| @xlink:href | O | specifies a reference to an external EventStream element |
| @xlink:actuate | OD default: onRequest | specifies the processing instructions, which can be either "onLoad" or "onRequest". This attribute shall not be present if the @xlink:href attribute is not present. |
| @schemeIdUri | M | urn:mpeg:dash:alternativempd:2022 |
| @value | O | Not used |
| @timescale | O | Used if necessary |
| @presentationTimeOffset | OD Default: 0 | Not used. |
| Event | 0 . . . N | specifies one event. Events in Event Streams m be ordered such that their presentation time is non-decreasing. |

Key
For attributes: M = mandatory, O = optional, OD = optional with default value, CM = conditionally mandatory
For elements: <minOccurs> . . . <maxOccurs> (N = unbounded)
Elements are bold; attributes are non-bold and preceded with an @.

TABLE 3

Event Semantics

| Event or Attribute Name | Use | Description |
|---|---|---|
| Event | | |
| @presentationTime | OD default: 0 | The offset from the start of Period to play the alternative MPD with the following values:<br>- 0: Immediately at the MPD download (preroll).<br>- End: Any value between 0 and Period duration: midroll.<br>- Equal or larger than the Period duration: At the end of the current MPD timeline |
| @duration | O | A value equal to or larger than Period duration |
| @id | O | Specifies an identifier for this instance of the event. Events with equivalent content and attribute values in the Event element shall have the same value for this attribute. The scope of the @id for each Event is with the same @schemeIdURI and @value pair. |
| @rejoinTime | O Default: end | The time for rejoining the main MPD with the following possible values:<br>• 0: Departure time to the alternative MPD in the main MPD<br>• end: End of alternative MPD presentation<br>• live: To the live edge of the main MPD<br>• PTXX: Offset from the departure time in the main MPD. |

TABLE 3-continued

Event Semantics

| Event or Attribute Name | Use | Description |
|---|---|---|
| @stackMode | O Default: OneWay | The mode of stacking operation with the following values:<br>- oneWay<br>- playOnce<br>- playEverytime |
| @contentEncoding | O | Not used. |
| @messageData | O | Not used. |

Key
For attributes: M = mandatory, O = optional, OD = optional with default value, CM = conditionally mandatory
For elements: <minOccurs> . . . <maxOccurs> (N = unbounded)
Elements are bold; attributes are non-bold and preceded with an @.

According to an aspect, the event scheme may be on_receive dispatch mode since the alternative MPD needs to be downloaded before the event's presentationTime. In some embodiments, the event instances may be repeated in various periods. In particular, if pre-roll playback is desired with the playback of any period. If only one pre-roll playback is desired even if the player plays multiple periods (i.e. pre-roll at the start of playback of the first period that is played), then the equivalency rule may be applied for all event instances cross period that represent that pre-roll playback.

Embodiments of the present disclosure are related to methods for signaling the auxiliary media presentations from the main media presentation defined in MPD, for insertion of pre-roll, mid-roll, and end-roll auxiliary media content in the media presentation wherein the auxiliary MPD URL, the departure and the rejoining times, and the stacking operations between various levels of auxiliary MPDs are signaled. In some embodiments, the main content may be departed at the beginning before start of its playback, in the middle or at the end. In some embodiments, after playing the auxiliary content or a specific duration of it, the player may be instructed to continue playback of the main content, from the point that it was left out, from the present moment, or for any moment in between. When a sequence of auxiliary MPDs is present, various stacking operational modes that are supported may also be signaled.

In some embodiments, auxiliary MOD support may be signaled using the essential or supplemental descriptor at the MPD level. In some embodiments, the essential or supplemental descriptor include the needed information for departing and rejoining the main media content playback, as well as the auxiliary MPD URL.

In some embodiments, auxiliary MOD support may be signaled using MPD events. These MPD events include all the needed information for departing and rejoining the maim media content playback, as well as the auxiliary MPD URL. Further, in some embodiments, based on the playback of the auxiliary media content repeating equivalent and non-equivalent events at various period may be used.

Figure 4:
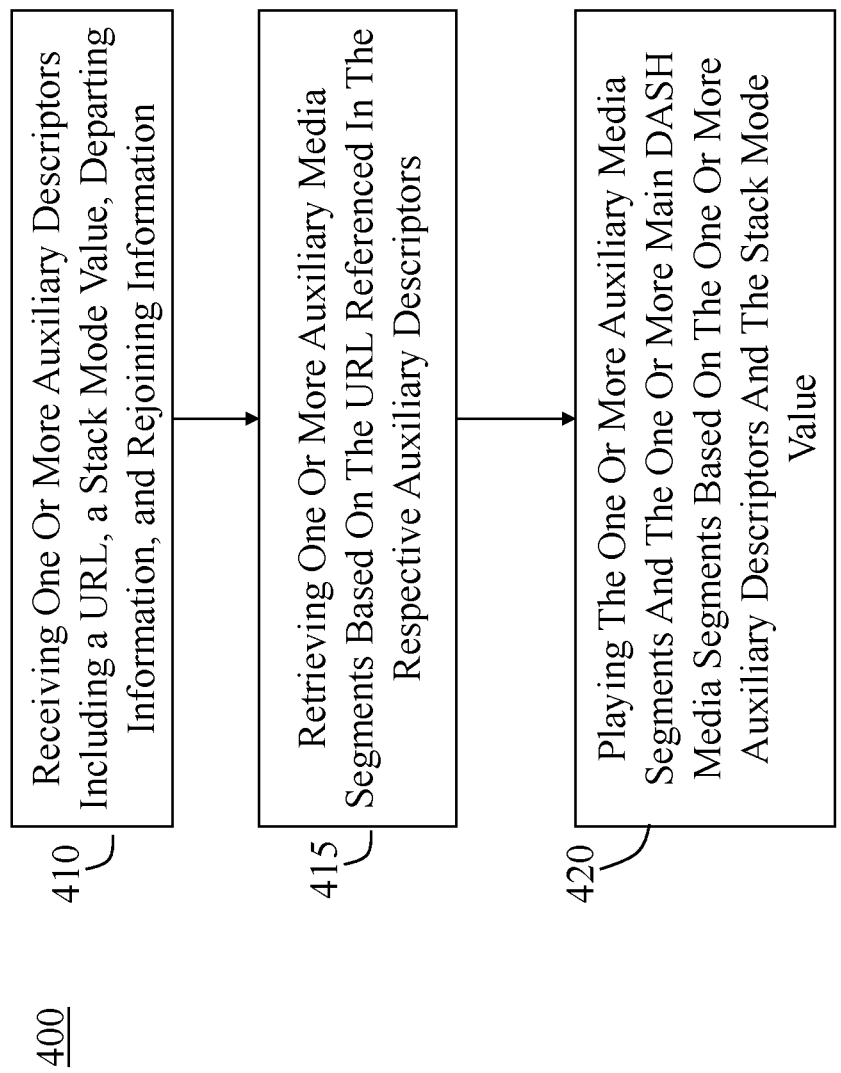
FIG. 4 is an exemplary flowchart illustration for signaling chained auxiliary media content including pre-roll media content, mid-roll media content, and end-roll media content in a main dynamic adaptive streaming over HTTP (DASH) media stream, in accordance with embodiments.

FIG. 4 illustrates an exemplary flowchart of a process 400 for signaling chained auxiliary media content including pre-roll media content, mid-roll media content, and end-roll media content in a main dynamic adaptive streaming over HTTP (DASH) media stream.

At operation 410, one or more auxiliary descriptors may be received. In embodiments, respective auxiliary descriptors among the one or more auxiliary descriptors may include a Uniform Resource Locator (URL) referencing one or more auxiliary MPDs and a stack mode value indicating a stack operation supported by a main DASH media stream.

In some embodiments, the stack mode value may include a first stack mode value that may indicate a cyclical replaying or ordered playing of the one or more auxiliary media segments in a stack. A second stack mode value may indicate playing an auxiliary media segment of the one or more auxiliary media segments in the stack only once. A third stack mode value may indicate that an auxiliary descriptor of the one or more auxiliary descriptors is evaluated at each level of the stack. As an example, the first stack mode value may be "oneWay," the second stack mode value may be "playOnce," and the third stack mode value may be "playEverytime."

In some embodiments, the one or more auxiliary descriptors further include departing information and rejoining information. Departing information may include a first value for playing the one or more auxiliary media segments. The first value may be relative to MPD availability start time (AST) of a main MPD. In some embodiments, the departing information may include a first departing value that indicates that the one or more auxiliary media segments be played immediately upon retrieval. As an example, the first departing value may be 0. A second departing value may indicate that the one or more auxiliary media segments be played at an end of a current MPD, where the current MPD may be one of the main MPD or an auxiliary MPD among the one or more auxiliary MPDs. As an example, the second departing value may be end. A third departing value may indicate that the one or more auxiliary media segments be played at a specific offset from the MPD availability start time. As an example, the third departing value may be an offset time.

Rejoining information may include a second value for rejoining the main MPD. A first rejoining value may indicate a return to the main MPD at a departure time from the main MPD to the one or more auxiliary MPDs. The first rejoining value may be 0. A second rejoining value may indicate a return to the main MPD at an end of the one or more auxiliary MPDs. The second rejoining value may be end. A third rejoining value may indicate a return to a live edge of the main MPD, and may be live. A fourth rejoining value may indicate a return to the main MPD at an offset of the departure time from the main MPD to the one or more auxiliary MPDs. The fourth rejoining value may be a specific offset time relative to the MPD AST.

At operation 415, one or more auxiliary media segments may be retrieved based on the URL referenced in the respective auxiliary descriptors among the one or more auxiliary descriptors. The one or more auxiliary media segments may be independent of one or more main DASH media segments.

At operation 420, the one or more auxiliary media segments and the one or more main DASH media segments may be played from a media source extension (MSE) source buffer based on the one or more auxiliary descriptors and the stack mode value.

In some embodiments, the one or more auxiliary descriptors may be signaled in an essential descriptor at an MPD level or a supplemental descriptor at the MPD level. In some embodiments, the one or more auxiliary descriptors may be signaled as an MPD event. The MPD event may have an event scheme with an on_receive dispatch mode. In some embodiments, the MPD event may have an equivalency rule that applies to all instances of the MPD event. In some embodiments, the MPD event may have equivalency rule that applies to particular instances of the MPD event. The MPD event may include departing information, rejoining information, and the stack mode value.

Although FIG. 4 shows example blocks of the processes 400, in embodiments, the processes 400 may include additional blocks, fewer blocks, different blocks, or differently arranged blocks than those depicted in FIG. 4. In embodiments, any blocks of processes 400 may be combined or arranged in any amount or order, as desired. In embodiments, two or more of the blocks of the processes 400 may be performed in parallel.

The techniques described above, can be implemented as computer software using computer-readable instructions and physically stored in one or more computer-readable media or by a specifically configured one or more hardware processors. For example, FIG. 5 shows a computer system 500 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
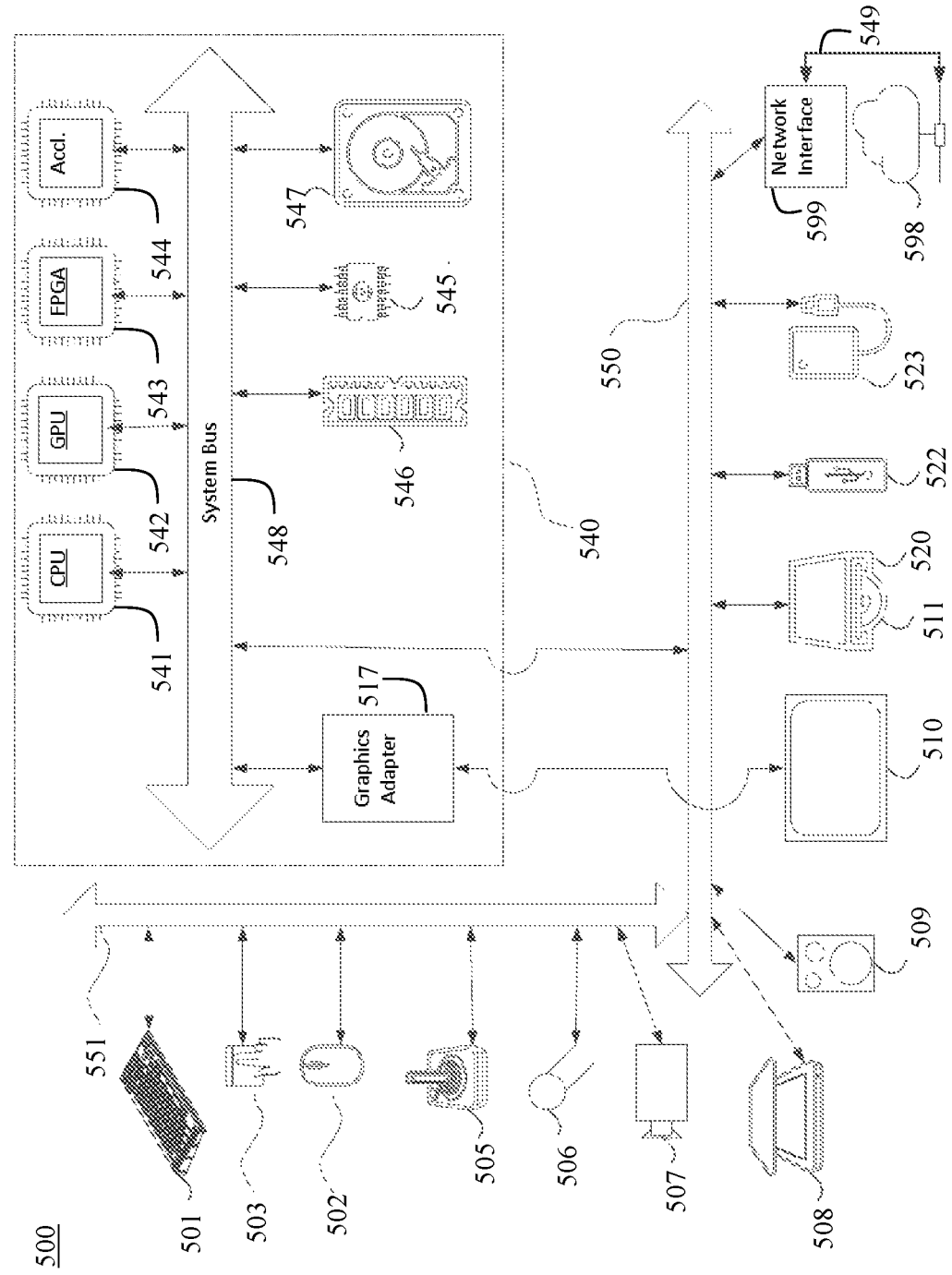
FIG. 5 is a simplified diagram of a computer system, in accordance with embodiments.

The components shown in FIG. 5 for computer system 500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 500.

Computer system 500 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each is depicted in the Figures): keyboard 501, mouse 502, trackpad 503, touch screen 510, joystick 505, microphone 506, scanner 508, camera 507.

Computer system 500 may also include certain human interface output devices. Such human interface output devices may be stimulating the senses of one or more human users through, for example, tactile output, sound, light, and smell/taste. Such human interface output devices may include tactile output devices (for example tactile feedback by the touch screen 510, or joystick 505, but there can also be tactile feedback devices that do not serve as input devices), audio output devices (such as: speakers 509, headphones), visual output devices (such as screens 510 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses, holographic displays and smoke tanks), and printers.

Computer system 500 can also include human accessible storage devices and their associated media such as optical media including CD/DVD ROM/RW 520 with CD/DVD 511 or the like media, thumb-drive 522, removable hard drive or solid state drive 523, legacy magnetic media such as tape and floppy disc, specialized ROM/ASIC/PLD based devices such as security dongles, and the like.

Those skilled in the art should also understand that term "computer readable media" as used in connection with the presently disclosed subject matter does not encompass transmission media, carrier waves, or other transitory signals.

Computer system 500 can also include interface 599 to one or more communication networks 598. Networks 598 can for example be wireless, wireline, optical. Networks 598 can further be local, wide-area, metropolitan, vehicular and industrial, real-time, delay-tolerant, and so on. Examples of networks 598 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 598 commonly require external network interface adapters that attached to certain general-purpose data ports or peripheral buses (750 and 551) (such as, for example USB ports of the computer system 500; others are commonly integrated into the core of the computer system 500 by attachment to a system bus as described below (for example Ethernet interface into a PC computer system or cellular network interface into a smartphone computer system). Using any of these networks 598, computer system 500 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 540 of the computer system 500.

The core 540 can include one or more Central Processing Units (CPU) 541, Graphics Processing Units (GPU) 542, a graphics adapter 517, specialized programmable processing units in the form of Field Programmable Gate Areas (FPGA) 543, hardware accelerators for certain tasks 544, and so forth. These devices, along with Read-only memory (ROM) 545, Random-access memory 546, internal mass storage such as internal non-user accessible hard drives, SSDs, and the like 547, may be connected through a system bus 548. In some computer systems, the system bus 548 can be accessible in the form of one or more physical plugs to enable extensions by additional CPUs, GPU, and the like. The peripheral devices can be attached either directly to the core's system bus 548, or through a peripheral bus 551. Architectures for a peripheral bus include PCI, USB, and the like.

CPUs 541, GPUs 542, FPGAs 543, and accelerators 544 can execute certain instructions that, in combination, can make up the aforementioned computer code. That computer code can be stored in ROM 545 or RAM 546. Transitional data can be also be stored in RAM 546, whereas permanent data can be stored for example, in the internal mass storage 547. Fast storage and retrieval to any of the memory devices can be enabled through the use of cache memory, that can be closely associated with one or more CPU 541, GPU 542, mass storage 547, ROM 545, RAM 546, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 500 having the illustrated architecture, and specifically the core 540 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 540 that are of non-transitory nature, such as core-internal mass storage 547 or ROM 545. The software implementing various embodiments of the present disclosure can be stored in such devices and executed by core 540. A computer-readable medium can include one or more memory devices or chips, according to particular needs. The software can cause the core 540 and specifically the processors therein (including CPU, GPU, FPGA, and the like) to execute particular processes or particular parts of particular processes described herein, including defining data structures stored in RAM 546 and modifying such data structures according to the processes defined by the software. In addition or as an alternative, the computer system can provide functionality as a result of logic hardwired or otherwise embodied in a circuit (for example: accelerator 544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for signaling chained auxiliary media content over Dynamic Adaptive Streaming over Hypertext Transfer Protocol (DASH) media stream, the method being performed by at least one processor, the method comprising:
    receiving one or more auxiliary descriptors associated with a main DASH media stream, wherein a respective auxiliary descriptor among the one or more auxiliary descriptors includes a Uniform Resource Locator (URL) referencing one or more auxiliary media presentation descriptions (MPDs) and a stack mode value indicating a stack operation supported by the main DASH media stream,
        wherein a first value of the stack mode value indicates that all auxiliary media segments of the one or more auxiliary MPDs in a stack are played only once in an order,
        wherein a second value of the stack mode value indicates that the all auxiliary media segments in the stack are played in the order cyclically such that a first auxiliary media segment of the one or more auxiliary MPDs in the stack is replayed after a last auxiliary media segment of the one or more auxiliary MPDs in the stack, and
        wherein a third value of the stack mode value indicates that at least one auxiliary media segment in the stack is replayed a plurality of times and out of the order based on a stack level;
    retrieving one or more auxiliary media segments based on the URL referenced in the respective auxiliary descriptors among the one or more auxiliary descriptors, wherein the one or more auxiliary media segments is independent of one or more main DASH media segments; and
    playing the one or more auxiliary media segments and the one or more main DASH media segments from a media source extension (MSE) source buffer at least once based on the one or more auxiliary MPDs and the stack mode value.

2. The method of claim 1, wherein the one or more auxiliary descriptors further include:
    a departing information, wherein the departing information comprises a first information for playing the one or more auxiliary media segments, wherein the first value is relative to MPD availability start time (AST) of a main MPD; and
    a rejoining information, wherein the rejoining information comprises a second information for rejoining the main MPD.

3. The method of claim 2, wherein the departing information comprises one of:
    a first departing value indicating that the one or more auxiliary media segments be played immediately upon retrieval;
    a second departing value indicating that the one or more auxiliary media segments be played at an end of a current MPD, wherein the current MPD is one of the main MPD and an auxiliary MPD among the one or more auxiliary MPDs; and
    a third departing value indicating that the one or more auxiliary media segments be played at a specific offset from the MPD availability start time.

4. The method of claim 2, wherein the rejoining information comprises one of:
    a first rejoining value indicating a return to the main MPD at a departure time from the main MPD to the one or more auxiliary MPDs;

a second rejoining value indicating a return to the main MPD at an end of the one or more auxiliary MPDs;

a third rejoining value indicating a return to a live edge of the main MPD; and a fourth rejoining value indicating a return to the main MPD at an offset of the departure time from the main MPD to the one or more auxiliary MPDs.

5. The method of claim 1, wherein the one or more auxiliary descriptors is signaled in an essential descriptor at an MPD level or a supplemental descriptor at the MPD level.

6. The method of claim 1, wherein the one or more auxiliary descriptors is signaled as an MPD event.

7. The method of claim 6, wherein the MPD event has an event scheme with an on_receive dispatch mode.

8. The method of claim 6, wherein the MPD event has an equivalency rule that applies to all instances of the MPD event.

9. The method of claim 6, wherein the MPD event has an equivalency rule that applies to particular instances of the MPD event.

10. The method of claim 6, wherein the MPD event comprises departing information, rejoining information, and the stack mode value.

11. An apparatus for signaling chained auxiliary media content over Dynamic Adaptive Streaming over Hypertext Transfer Protocol (DASH) media stream, the apparatus comprising:

at least one memory configured to store computer program code;

at least one processor configured to access the computer program code and operate as instructed by the computer program code, the computer program code including:

receiving code configured to cause the at least one processor to receive one or more auxiliary descriptors associated with a main DASH media stream, wherein a respective auxiliary descriptor among the one or more auxiliary descriptors includes a Uniform Resource Locator (URL) referencing one or more auxiliary media presentation descriptions (MPDs) and a stack mode value indicating a stack operation supported by the main DASH media stream, wherein a first value of the stack mode value indicates that all auxiliary media segments of the one or more auxiliary MPDs in a stack are played only once in an order, wherein a second value of the stack mode value indicates that the all auxiliary media segments in the stack are played in the order cyclically such that a first auxiliary media segment of the one or more auxiliary MPDs in the stack is replayed after a last auxiliary media segment of the one or more auxiliary MPDs in the stack, and wherein a third value of the stack mode value indicates that at least one auxiliary media segment in the stack is replayed a plurality of times and out of the order based on a stack level;

retrieving code configured to cause the at least one processor to retrieve one or more auxiliary media segments based on the URL referenced in the respective auxiliary descriptors among the one or more auxiliary descriptors, wherein the one or more auxiliary media segments is independent of one or more main DASH media segments; and playing code configured to cause the at least one processor to play the one or more auxiliary media segments and the one or more main DASH media segments from a media source extension (MSE) source buffer at least once based on the one or more auxiliary MPDs and the stack mode value.

12. The apparatus of claim 11, wherein the one or more auxiliary descriptors further include:

a departing information, wherein the departing information comprises a first information for playing the one or more auxiliary media segments, wherein the first value is relative to MPD availability start time (AST) of a main MPD; and a rejoining information, wherein the rejoining information comprises a second information for rejoining the main MPD.

13. The apparatus of claim 11, wherein the one or more auxiliary descriptors is signaled in an essential descriptor at an MPD level or a supplemental descriptor at the MPD level.

14. The apparatus of claim 11, wherein the one or more auxiliary descriptors is signaled as an MPD event.

15. The apparatus of claim 14, wherein the MPD event has an equivalency rule that applies to all instances of the MPD event.

16. A non-transitory computer-readable medium storing instructions, the instructions comprising: one or more instructions that, when executed by one or more processors of a device for signaling chained auxiliary media content including pre-roll media content, mid-roll media content, and end-roll media content in a main dynamic adaptive streaming over HTTP (DASH) media stream, cause the one or more processors to:

receiving one or more auxiliary descriptors associated with a main DASH media stream, wherein a respective auxiliary descriptor among the one or more auxiliary descriptors includes a Uniform Resource Locator (URL) referencing one or more auxiliary media presentation descriptions (MPDs) and a stack mode value indicating a stack operation supported by the main DASH media stream, wherein a first value of the stack mode value indicates that all auxiliary media segments of the one or more auxiliary MPDs in a stack are played only once in an order, wherein a second value of the stack mode value indicates that the all auxiliary media segments in the stack are played in the order cyclically such that a first auxiliary media segment of the one or more auxiliary MPDs in the stack is replayed after a last auxiliary media segment of the one or more auxiliary MPDs in the stack, and wherein a third value of the stack mode value indicates that at least one auxiliary media segment in the stack is replayed a plurality of times and out of the order based on a stack level;

retrieving one or more auxiliary media segments based on the URL referenced in the respective auxiliary descriptors among the one or more auxiliary descriptors, wherein the one or more auxiliary media segments is independent of one or more main DASH media segments; and playing the one or more auxiliary media segments and the one or more main DASH media segments from a media source extension (MSE) source buffer at least once based on the one or more auxiliary MPDs and the stack mode value.

17. The non-transitory computer-readable medium of claim 16, wherein the one or more auxiliary descriptors further include:

a departing information, wherein the departing information comprises a first information for playing the one or more auxiliary media segments, wherein the first value is relative to MPD availability start time (AST) of a main MPD; and a rejoining information, wherein the rejoining information comprises a second information for rejoining the main MPD.

* * * * *